United States Patent [19]

Nicholson

[11] Patent Number: 4,488,780
[45] Date of Patent: Dec. 18, 1984

[54] METHOD OF PRODUCING A COLOR CHANGE IN A CHEMICALLY COUPLED COLOR-CHANGING DISPLAY

[75] Inventor: Margie M. Nicholson, San Marino, Calif.

[73] Assignee: Rockwell International Corporation, El Segundo, Calif.

[21] Appl. No.: 585,669

[22] Filed: Mar. 2, 1984

Related U.S. Application Data

[62] Division of Ser. No. 327,856, Dec. 7, 1981, Pat. No. 4,456,337.

[51] Int. Cl.³ .............................................. G02F 1/23
[52] U.S. Cl. ...................................... 350/320; 350/357
[58] Field of Search ............... 350/320, 353, 355, 357, 350/359

[56] References Cited

U.S. PATENT DOCUMENTS 3,840,287  10/1974  Witzke et al. .................. 350/357
3,840,288  10/1974  Schnatterly ..................... 350/357
3,892,472   7/1975  Giglia ............................. 350/357

Primary Examiner—Bruce Y. Arnold
Attorney, Agent, or Firm—Gilbert H. Friedman; H. Fredrick Hamann

[57] ABSTRACT

A method of producing a color change in a distinct element of solid, insoluble color changing material capable of reversibly changing color by reaction with soluble reactants. Reactants at a point spaced apart from the distinct element are electrochemically generated, diffuse through an electrolyte, and react with the distinct element to cause a reversible color change.

7 Claims, 3 Drawing Figures

METHOD OF PRODUCING A COLOR CHANGE IN A CHEMICALLY COUPLED COLOR-CHANGING DISPLAY

The invention herein described was made in the course of or under a contract or subcontract thereunder with the Department of the Air Force.

This application is a division, of application Ser. No. 327,856, filed Dec. 7, 1981 now U.S. Pat. No. 4,456,337.

BACKGROUND OF THE INVENTION

1. Field of the Invention

The invention relates to the field of electrically controllable displays, and more particularly to the field of displays which change or switch color such as, for example, electrochromic display devices.

2. Description of the Prior Art

There are many uses for electrically controllable display devices. A number of such devices have been in commercial use for some time. These display devices include liquid crystal displays, light emitting diode displays, plasma displays and so on. Light emitting diode and plasma display panels both suffer from the fact that they are active, light emissive devices which require substantial power for their operation. In addition, it is difficult to fabricate light emitting diode displays in a manner which renders them easily distinguishable under bright ambient illumination. Liquid crystal displays suffer from the disadvantage that they are operative only over a limited temperature range and have substantially no memory within the liquid crystal material. Further, the visibility of many liquid crystal displays decreases as the viewer moves a few degrees off axis.

Electrochromic displays have been developed which display information through a change in the color of portions in the display via electrochemical reaction of an active material to achieve a color change. Generally, with a metal oxide as the active material, this color change is from white to a color such as blue. Because of their coloring mechanism, such displays usually require substantial power and time to write or erase displayed information. The quantities of power required are undesirably large, especially for battery operation. Moreover, the time required to change displayed information makes such materials unacceptable for many display applications. None of these displays shows more than a single color against a background. This limits the versatility of such displays since the variation of color of a character cannot be used to convey additional information.

Rare-earth diphthalocyanines are known from prior publications to have electrochromic properties in which the color of the diphthalocyanine can change over a period of about eight seconds upon application of a potential difference across an electrochemical cell having a diphthalocyanine film on one of the electrodes. P. N. Moskalev and I. S. Kirin, "Effect of the Electrode Potential on the Absorption Spectrum of a Rare-Earth Diphthalocyanine Layer," *Opt. i Spektrosk*, 29, 414 (1970) and P. N. Moskalev and I. S. Kirin, "The Electrochromism of Lanthanide Diphthalocyanines," *Russian J. Phys. Chem.*, 46, 1019 (1972).

U.S. Pat. No. 4,184,751 of M. M. Nicholson, the inventor herein, describes the use of metal diphthalocyanine complexes as the electrochromically active material in an electrochromic display cell. Rapid color changes in less than 50 milliseconds are achieved, thus alleviating the slow switching time previously reported for rare-earth diphthalocyanine complexes. Power requirements are small because of the low power switching characteristics of the display material and because the display exhibits an open circuit memory of from several minutes to several hours, depending on its construction. A multi-color, i.e., more than one color, display is achieved through use of a range of voltages applied between display and counter electrodes. Color reversal of displayed information and the background against which it is displayed is achieved through use of display electrodes in the background portions of the viewing area as well as in the character segments.

Matrix display devices contain one or more arrays of many small elements or dots of color-changing material that can be selectively activated or switched to form virtually any alphanumeric or graphic pattern. To create such patterns and erase them at will, a means must be provided to address each element independently without activating those in the surrounding area. An integrated drive matrix of thin-film transistors could be built into the display device for this purpose so that each element is provided, in effect, with a separate switch connecting it to the power supply. See T. P. Brody and P. R. Malmberg, "Large Scale Integration of Displays Through Thin-Film Transistor Technology," *Int. J. Hybrid Microelec.*, II, 29 (1979).

Although the use of an integrated drive matrix is an elegant general-purpose approach for matrix displays, its fabrication is relatively complicated. When possible, electronics engineers prefer to use the simpler multiplexed addressing scheme of the sort which uses two sets of parallel conductive, linearly-extending electrodes disposed at right angles. A thin layer of the display material and any associated component such as an electrolyte is disposed between the two sets of electrodes. When a display system is fully amenable to such addressing, a single selected dot or element can be activated by a signal applied across one electrode in each of the two sets of orthogonal electrodes.

But the use of multiplexed addressing with a matrix display using electrochromic materials can cause the loss of some of the inherent advantages of these materials. Even though electrochromic displays exhibit appropriate voltage threshold characteristics for good resolution of the individual elements or dots, the advantages of a potentially outstanding feature of such displays, memory or pattern retention, may be lost if the displays are multiplexed as described above. This is particularly true of a multicolor electrochromic system that provides different colors by undergoing both oxidation and reduction reactions. Memory or pattern retention is lost because of galvanic action between oppositely charged elements in contact with the same electronic conductor and electrolyte. The elements discharge to intermediate electrical and color states thereby erasing the information. A similar problem exists in a multiplexed electrochromic display containing a combination of a redox couple and a soluble switching material. See Arellano et al., "Matrix Addressed Electrochromic Display," U.S. Pat. No. 4,146,876 (1979). The loss of memory problem is overcome in the Arrelano et al. approach by frequent refreshing of the color through the use of a repetitive input signal. Unfortunately, this increases the power consumption.

SUMMARY OF THE INVENTION

Briefly, and in general terms, the invention is concerned with a display device wherein information is developed in one or more electronically isolated dots or elements of an insoluble display material which is capable of reversibly changing or switching its color by reaction with soluble oxidizing and reducing agents. An electronically isolated dot or element is one which is situated so that it cannot physically transfer electrons directly to or from an external circuit or to or from any other such dot or element. Such an electronically isolated dot or element is not prevented, however, from undergoing chemical electron transfer reactions with dissolved oxidizing or reducing agents and transferring an equivalent number of charge-compensating ions to or from the electrolyte. Each isolated dot of color-changing material is a display element associated with or aligned with and chemically coupled to a distinct electrode crossover region in a nearby electrochemical drive matrix which may be addressed by direct multiplexing. The soluble reactants are electrochemically generated at the drive matrix and are transported to the correspondingly selected display element by diffusion through a thin layer of electrolyte.

Since the display elements are electronically isolated from each other, there can be no galvanic interaction between them. Thus, there can be no spontaneous electrochemical erasure of information. In view of this isolation, a display device in accord with the invention has good memory or pattern retention in the absence of an applied signal. It thus can be driven or addressed by direct multiplexing circuitry, provided the drive matrix is capable of selectivity of a selected display element in the transient mode.

It follows then that a matrix display in accord with the invention should be relatively inexpensive to manufacture due to the simplicity of its directly multiplexible structure when compared with a relatively expensive integrated matrix drive structure based on thin-film transistors or other solid-state electronic technology.

Films of the color-changing display material used in this invention are preferably supported on an inert, insulative substrate of a fully compatible material. There is no need to dispose the color-changing material on a conductive transparent material such as tin oxide. Furthermore, by matching the thermal expansion coefficient of the substrate to that of the display material, the adhesion between them should be quite high. This factor will tend to increase the useful life of a display device in accord with the invention.

Since plastic can be used for the insulative substrate instead of glass, resistance to breakage can be increased.

When display material is disposed directly on an electrode, certain other deleterious effects can occur. For example, cathodic hydrogen evolution can cause a lutetium diphthalocyanine film to peel away from a tin oxide electrode. If, as in the invention, the color-changing material is not on an electrode surface, this problem cannot occur. In the present invention, the display material can be on any suitable substrate.

The display described in Arrelano et al., as mentioned above, lacks memory and has to be refreshed frequently by a repetitive input signal. On the other hand, since a device in accord with the invention uses an insoluble color-changing material rather than a soluble one, such refreshing is not required. Hence the average power is much lower. Furthermore, due to its pattern retention feature, information displayed in a device in accord with the invention is not lost in the event of a power failure.

The rare-earth diphthalocyanines are useful as electrochromic materials disposed directly on electrodes due, in part, to their relatively high solid-state conductivities. Of course, these materials are also expected to be well-suited for use in this invention. However, depending on the chemical kinetics, it is believed that it may be possible to use in this invention many other materials that can change color reversibly but which lack high solid-state conductivity or other properties favorable to a direct electrochromic response. This broad aspect of the invention exists because the color change reactions therein are essentially chemical rather than electrochemical.

It is not necessary with this invention to view the display elements through a transparent semiconductive substrate made of, for example, tin oxide or to insulate portions of the drive lines from the electrolyte. Electrodes in the drive matrix can be fabricated of a much more highly conductive metal which can be in direct contact with the electrolyte. This feature contributes to making a display device in accord with the invention relatively easy to fabricate. When a display device is to be viewed by reflected light only, the drive matrix ordinarily will be concealed by a body of white, porous optical background material which is immersed in and permeated by the liquid electrolyte. If the display is to be viewed by transmitted light, in a backlighted or projected arrangement, the drive matrix must be at least semitransparent. The electrodes may then consist of, or be disposed on, strips of semitransparent metal mesh.

In relation to the switching speed, the problem of line resistance is less serious in this display device with its metal electrodes than it is when long lines of tin oxide are used. In addition, although layer separation or thickness tolerances are important in a display device in accord with this invention, they can be sufficiently controlled by using state-of-the-art screening or lamination techniques. Therefore, it should be practical to build relatively large display panels incorporating this invention without having to construct exceedingly smooth plates of a material such as glass and then to secure the plates in closely spaced parallel disposition as in liquid crystal display devices.

DESCRIPTION OF THE PREFERRED EMBODIMENT

Figure 1:
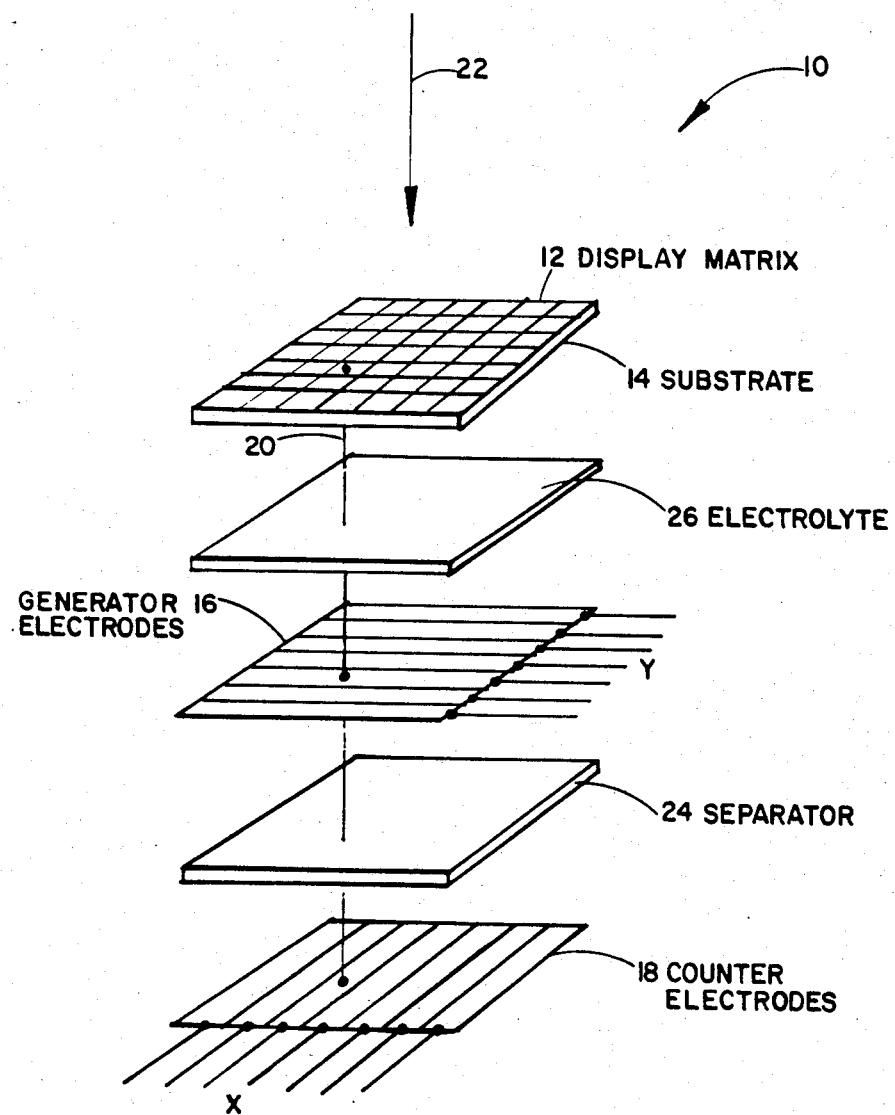
FIG. 1 is an exploded view in perspective of the internal elements of a color-changing display device in accord with the invention.

Referring now to FIG. 1, there are shown the essential internal parts of a chemically coupled color-changing matrix display device 10. A display matrix 12 comprises a plurality of coplanar, electronically isolated dots or elements of a solid, insoluble display material preferably disposed in orthogonal rows and columns on a planar surface of an insulating substrate 14. The display material may be any insoluble color-changing material such as, for example, a multicolor rare-earth diphthalocyanine, a two-color (blue and white) indigo dye or other insoluble dye which is capable of reversibly changing color by reaction with soluble oxidizing and reducing agents that are electrochemically generated. The substrate 14 may be of any compatible material such as, for example, a plastic, glass or alumina plate or a plastic film. The substrate 14 is preferably of a material which has substantially the same thermal expansion coefficient as the color-changing material disposed thereon so as to promote good adhesion thereto. The better the adhesion, the longer will be the life of the display device 10.

The remainder of the display device parts in FIG. 1 comprise drive matrix means for electrochemically generating the reactants, i.e., the soluble oxidizing and reducing agents. The reactants interact with the color-changing material to alter its color. The drive matrix is disposed parallel to and spaced apart from the planar surface of the substrate 14 on which the display matrix 12 is disposed.

The drive matrix includes a first linear array or set of generator electrodes 16 and a second linear array or set of counter electrodes 18. Each electrode is a relatively long and narrow, isolated conductive unit disposed parallel to the other electrodes of its array. The electrodes of each linear array are preferably disposed at right angles to or orthogonal to the electrodes of the other linear array in a distinct electrode plane spaced apart from and parallel to the other electrode plane. Both electrode planes are preferably parallel to the planar surface of the substrate 14 on which the display matrix 12 is disposed. The generator electrode plane is closer to the display matrix 12 inasmuch as it is interposed between the counter electrode plane and the display matrix 12.

Each intersection of an individual generator electrode 16 and an individual counter electrode 18 defines an electrode crossover region in which reactants for effecting color change are to be generated when an electrical signal of appropriate magnitude and polarity is applied across a selected generator electrode-counter electrode combination.

In this embodiment, the substrate 14 acts as a spacer between the display matrix 12 and the generator electrodes 16. The substrate and spacer 14 is porous enough to permit ready access of the electrochemically generated reactants to the color-changing material.

The electrodes of one of the linear arrays are aligned with the rows of display elements in the display matrix 12 while the electrodes of the remaining linear array are aligned with the columns thereof. Therefore, each color-changing dot or element of the display matrix 12 is aligned with a distinct generator electrode-counter electrode crossover region. This alignment is illustrated in FIG. 1 wherein the dashed line 20 is shown passing through the electrode intersection or crossover region defined by the third counter electrode 18 from the left edge and the third generator electrode 16 from the front edge in their respective electrode planes. The line 20 is shown extended to the display matrix 12 where it intersects the display element situated at coordinates $X=3$, $Y=3$ relative to an origin at the intersection of the left and front edges of the display matrix plane.

The display 10 is intended to be viewed in the direction indicated by the arrow 22. This gives the more direct observation of the display matrix 12. If the display 10 is to be front-lighted, i.e., viewed by reflected light, the counter electrodes 18 can be opaque. However, for a back-lighted or projected display, the counter electrodes 18 must either be transparent or semi-transparent. An open mesh structure will meet the latter requirement. The generator electrodes 16 also are required to have an open-mesh or similar structure so that reactants formed there can escape and diffuse to the display matrix 12. For a back-lighted or projected display, the generator electrodes 16 must be sufficiently transparent for viewing by transmitted light.

Interposed between the generator electrodes 16 and the counter electrodes 18 is a selective separator 24 which, in effect, divides the interior of the display device into two compartments. The first compartment contains the generator electrodes 16 and the display matrix 12 while the second compartment contains the counter electrodes 18. The selective separator 24 prevents loss of electrochemically generated reactant species from the compartment containing the generator electrodes 16 and the display matrix 12. Stated alternatively, the separator 24 excludes or confines the electrochemically generated reactant species away from the compartment containing the counter electrodes 18. Thus, the generated reactants are preserved for reaction with display material only. In addition, the separator 24 is required to confine certain soluble chemical species to the compartment of the generator electrodes 16 and display matrix 12 and prevent contamination of the counter electrodes 18 where these species could interfere with the operation of the counter electrodes 18. Similarly, the separator 24 is required to confine certain other soluble chemical species to the compartment of the counter electrodes 18 and prevent contamination of the generator electrodes 16 and of the display material in the display matrix 12 where these other species could interfere with the operation of the generator electrodes 16 or with the operation of the display material. However, the separator 24 does permit the passage of current-carrying ions between the generator and counter electrode arrays 16 and 18. A semi-permeable separator 24 made of, for example, an ion exchange resin is preferred but a retentive diffusion barrier containing electrolyte may serve as an adequate separator 24 in some cases. An ion exchange resin exhibits selective permeability due to its ability to transport primarily cations or anions. A retentive diffusion barrier retards the undesired passage of chemical species because of its microporous structure. The diffusion barrier can be of a microporous layer of inert material fabricated by screening. Since these porous layers are usually white, they can serve as optical backing in a front-lighted display or as a translucent light-transmitter in a back-lighted display. Alternatively, the separator 24 may be a molecular filter having selective permeability due to its ability to transport only chemical species smaller than a certain size. Excessive thickness of the separator 24 will diminish pattern resolution in the drive matrix.

The generator electrodes 16 are preferably of a highly conductive, inert material such as, for example, gold. The counter electrodes 18 preferably include an electrochemical couple with insoluble active components, such as silver-silver bromide, which will not impose special requirements on the separator 24. Soluble counter electrode couples such as iodide-triiodide are not ruled out, however, if an appropriate separator 24 is used. If both members of the counter-electrode couple are soluble, as in the case of iodide-triiodide, the separator 24 must be retentive enough to exclude the more active member, such as triiodide, from the region of the display matrix 12.

The layer shown at 26 in FIG. 1 represents a body of electrolyte solution contacting the display matrix 12, the generator electrodes 16 and the counter electrodes 18. The portion of the electrolyte solution 26 in contact with the display matrix 12 and the generator electrodes 16 initially contains a component of each of two redox couples. As indicated above, any components of the redox couples that would interfere with the operation of the counter electrodes 18 are excluded or confined away from the region of the counter electrodes 18 by the separator 24. The initial component of one redox couple is in the reduced form while the initial component of the other redox couple is in the oxidized form. The electrolyte solution 26 may also include an inert supporting electrolyte. This may be a simple inorganic salt such as, for example, potassium chloride. The initial redox couple components must be compatible with one another and with the color-changing material of the display matrix 12 so that no color change or other change occurs until an electrical signal is applied to the display.

Chemically, the operation of the display device 10 is similar to that of indirect coulometry, a technique developed for the investigation of redox processes in biological materials that are sterically unable to react directly at an electrode surface. See F. M. Hawkridge and T. Kuwana, "Indirect Coulometric Titration of Biological Electron Transport Components," *Anal. Chem.*, 45, 1021 (1973).

When a current is passed in the drive matrix with the selected generator electrodes 16 as the anode and the selected counter electrodes 18 as the cathode, an oxidizing agent is formed at the surfaces of the generator electrodes 16. This reactant diffuses across the layer of electrolyte solution 26 from the generator electrodes 16 to the correspondingly selected or addressed color-changing material in the display matrix 12. The oxidizing agent reacts with the color-changing material to change its color and, in the process, is regenerated as the initial redox component in the reduced state. Thus, the soluble redox system mediates, or couples, the color-changing material in the display matrix 12 to the generator electrodes 16 without being consumed itself. In the display cell 10, the anodic charge passed at the generator electrodes 16 should be that required to completely convert the amount of color-changing material present in the addressed elements of the display matrix 12. On controlled electrolysis in the opposite direction, the component of the other redox couple generates a reducing agent which reacts with the oxidized color-changing material and brings it back to its initial color state. It is apparent that there is no net change in the color-changing material or the reactants. Thus, the cycle should be repeatable many times. With some color-changing materials, if the reverse electrolysis is carried further by the passage of additional cathodic charge, the color-changing material may be reduced beyond its original color state to a third or even a fourth color state. Hence, in addition to being applicable to two-color displays, the scheme of this invention is adaptable to the operation of multicolor displays wherein the color-changing material has more than two color states.

As will be apparent to those skilled in the art, the above-recited process may be reversed in that the first reactant generated may be a reducing agent to react with a suitable color-changing material to switch the material from its initial color state by reduction rather than by oxidation. It will also be apparent that further oxidized states may exist to provide additional colors.

By way of example, a suitable color-changing material for a display device 10 in accord with the invention is lutetium diphthalocyanine, often abbreviated LuH(Pc)$_2$, initially in a green color state. The initial soluble redox component in the reduced form may be the bromide anion, Br$^-$. When a current is passed in the drive matrix with the selected generator electrodes 16 as the anode and the selected counter electrodes 18 as the cathode, the bromide anion is oxidized at the generator electrodes 16 to form bromine, Br$_2$. The bromine reactant diffuses across the electrolyte layer 26 to the display matrix 12 where the lutetium diphthalocyanine is switched from its initial green color to a red color state by oxidation. In the process, the initial redox component, the bromide anion Br$^-$, is regenerated.

The initial soluble redox component in the oxidized form may be the colorless methyl viologen (1,1'-dimethyl-4,4'-bipyridyl) cation, abbreviated MV$^{++}$. On controlled electrolysis in the reverse direction, a current is passed in the drive matrix with the generator electrodes 16 as the cathode and the counter electrodes 18 as the anode. The methyl viologen cation is reduced at the generator electrodes 16 to form MV$^+$. This reactant diffuses across the electrolyte layer 26 to the display matrix 12 where the lutetium diphthalocyanine is switched from the red color state to its initial green color state by reduction. In the process, the initial redox component, the colorless methyl viologen cation MV$^{++}$, is regenerated. Although the MV$^+$ species is strongly colored, it is present only during the switching process. Hence, it should not significantly alter the appearance of the display.

If the reverse electrolysis is carried further by the passage of additional cathodic charge, the lutetium diphthalocyanine may be further reduced beyond the green state to a blue form. The reaction sequence below illustrates the type of chemical process involved in this additional reduction.

At Metal Electrode (Generation of Reducing Agent)

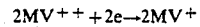
2MV$^{++}$ + 2e → 2MV$^+$

At Display Matrix Surface (Chemical Switching of Color-Changing Material from Green to Blue)

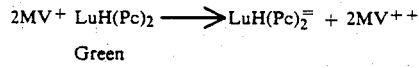
2MV$^+$ + LuH(Pc)$_2$ ⟶ LuH(Pc)$_2^=$ + 2MV$^{++}$
Green

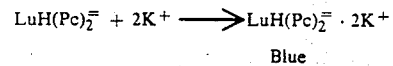
LuH(Pc)$_2^=$ + 2K$^+$ ⟶ LuH(Pc)$_2^=$ · 2K$^+$
Blue

Net Result (Indirect Electrochemical Switching)

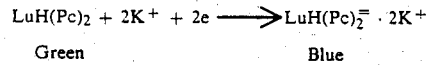
LuH(Pc)$_2$ + 2K$^+$ + 2e ⟶ LuH(Pc)$_2^=$ · 2K$^+$
Green             Blue In principal, only two redox couples are needed to cycle a diphthalocyanine film through all of its oxidation states, or colors. One redox couple should have an equilibrium potential more negative than any in the color-changing material system, and the other should have an equilibrium potential more positive than any of those for the color-changing material. It is further desired that different states of the color-changing material within a given dot be capable of interacting with one another to reach equilibrium fairly quickly after passage of a switching charge. For example, in converting a lutetium diphthalocyanine film from red to green, any overdriving of the outer surface to blue should be only temporary. From observations of lutetium diphthalocyanine, it is anticipated that such equilibration can occur easily across several thousand angstroms of film thickness. Standard potentials are not yet known in this color-changing material system, but some practical relations of color and absorption spectra to potential are given in M. M. Nicholson and R. V. Galiardi, "Investigation of Lutetium Diphthalocyanine as an Electrochromic Display Material," Final Report, Contract N62269-76-C-0574, C77-215/501, NADC-76283-30, May 1977, Electronics Research Center, Rockwell International, Anaheim, Calif.

Certain color conversions of lutetium diphthalocyanine have been observed. $MV^{++}$ has been electrochemically reduced to $MV^+$ which then reacted with this display material to switch its color to blue from green. $Br^-$ has been electrochemically oxidized to form $Br_2$ which then reacted with this display material to switch its color from green to red. With mixtures containing both couples ($MV^+/MV^{++}$ and $Br^-/Br_2$), reversible switching has been observed.

Figure 2:
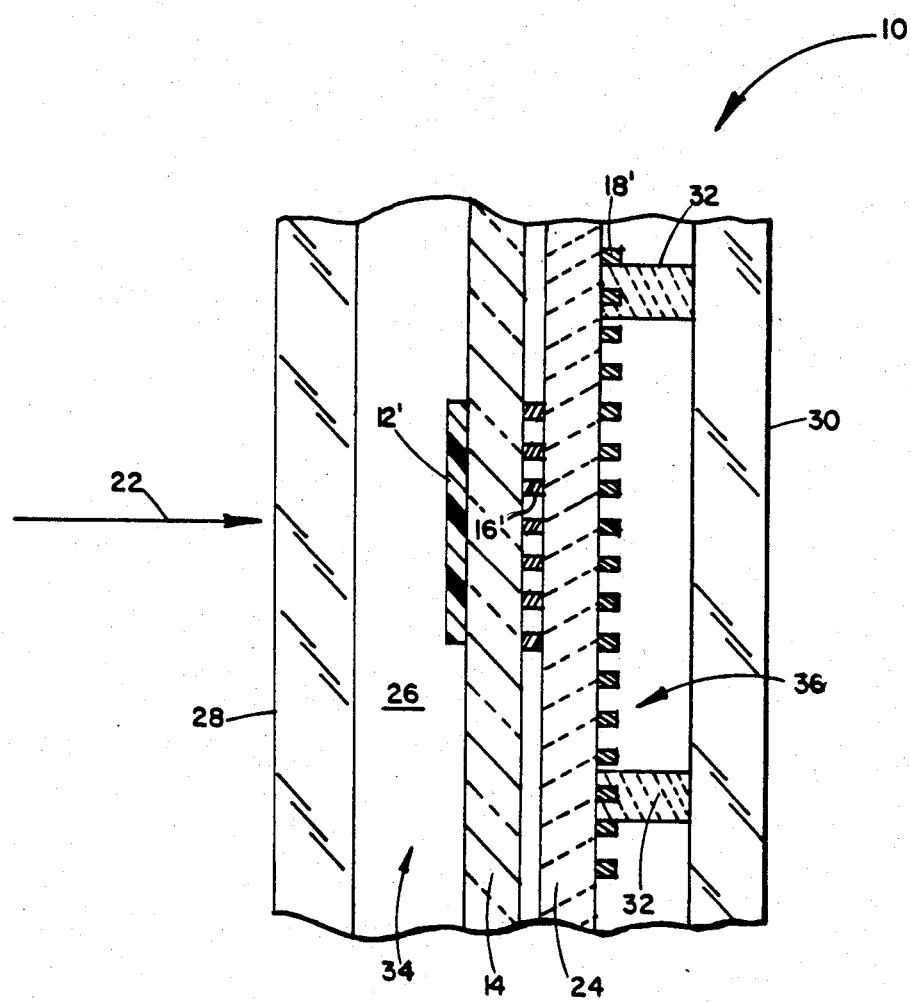
FIG. 2 is a cross-section of a portion of a color-changing display device in accord with the invention.

The cross-sectional view of the display device 10 in FIG. 2 is expanded to show certain of its details. A single generator electrode 16', having an open mesh structure, extends horizontally and perpendicular to the plane of the drawing. A single counter electrode 18', also having an open mesh structure, extends vertically and parallel to the plane of the drawing. Interposed between the a generator electrode 16' and the counter electrode 18' is the selective separator 24.

A single, electronically isolated, distinct display element 12' of color-changing material is shown disposed on the porous substrate and spacer 14 and aligned with the distinct intersection or crossover region of generator electrode 16' and counter electrode 18'.

A front panel 28 for the display device envelope is of any suitable transparent material such as a clear plastic or glass. A rear panel 30 for the envelope may be of the same transparent material although it may be of an opaque material if the display is to be front-lighted.

Two compartments 34 and 36 containing the body of electrolyte 26 are shown in FIG. 2. The compartment 34, shown to the left of the separator 24, includes the generator electrode 16', the substrate and spacer 14 and the display element 12'. The compartment 34 contains that portion of the body of electrolyte 26 having the redox components therein which are needed to react at the generator electrode. The compartment 36, shown to the right of the separator 24, includes the counter electrode 18'. The compartment 36 contains that portion of the body of electrolyte 26 from which redox components are excluded unless some of them happen to be common to the counter electrode system. For example, a component such as bromide ion can be one of the main redox components, so that $$2Br^- \rightarrow Br_2 + 2e$$

at the generator electrode. Sometimes the same component can be part of the counter electrode system:

$$AgBr + e \rightarrow Ag + Br^-.$$

In this case, one can use a separator 24 which is permeable to bromide ion.

The compartments 34 and 36 are shown in FIG. 2 to have substantial size for the purpose of providing an excess of reactants. Longer device life is thereby provided in the event of gradual depletion of the reactants when the display device 10 is put in service. Where depletion is not a factor, the display device 10 can be made more compact by making the compartments 34 and 36 smaller.

In the embodiment of FIGS. 1 and 2, the substrate and spacer 14 supporting display element 12' controls the displacement between display element 12' and generator electrode 16'. The spacer 14 may be transparent, translucent or, when it is used as optical backing in a front-lighted display, white. It is necessary that the spacer 14 have relatively high porosity. Electrolyte 26 fills the spacer pores which must be large enough to permit virtually unobstructed passage of the soluble reactants.

The displacement or distance between the display element 12' and the portion of the generator electrode 16' in the crossover region of generator and counter electrodes 16' and 18' is very small. This is necessary for rapid switching of color, since a reactant must travel by diffusion from its generation site across a layer of the electrolyte 26 to display element 12'. For example, if the reactant has a diffusion coefficient of $1 \times 10^{-5}$ cm$^2$/sec in the liquid phase, and a switching time of one hundred milliseconds is desired, the distance between the generator electrode and the surface of display element 12' should be approximately fourteen microns. This estimate is made from the relationship $\Delta t = (\Delta X)^2 / 2D$ where $\Delta t$ is the transport time across a layer of thickness $\Delta X$ and D is the diffusion coefficient. With a five-micron separation distance, the response time would be reduced to approximately twelve milliseconds.

On the other hand, the distance from the intersection or crossover region of generator and counter electrodes 16' and 18' to the display elements adjacent to display element 12' in display matrix 12 is preferably sufficiently great that diffusion of reactants to these adjacent display elements from the selected electrode crossover region is insufficient to create a visible effect. That is to say that the lateral spacing between adjacent display elements is preferably large compared to $\Delta X$.

The electrolyte properties and the spacing between the generator electrodes 16 and the counter electrodes 18 in the drive matrix should be chosen to give good resolution, i.e., to generate reactant only at the selected intersections. This condition is approached by making that portion of the drive matrix between the generator electrodes 16 and the counter electrodes 18 relatively thin and of relatively high resistivity. Resolution is improved further if the separator 24 is a membrane having pores extending perpendicular to the membrane surface so that the effective resistivity of the electrolyte-membrane layer is anisotropic. A threshold voltage in the electrochemical current-voltage characteristic at the generator or counter electrode surface is also conducive to good resolution.

It is preferable to address a selected display element with a current pulse, rather than a voltage pulse, since it is the amount of charge passed in generating a given amount of reactant which is most closely related to the amount of color-changing material to be switched.

However, a voltage pulse of suitably controlled amplitude and duration may also be used.

Shown at 32 is a support for the multilayered central structure of the display device 10 comprising the display matrix 12 and the drive matrix. The support 32 is preferably porous. It is also preferably transparent if the display device 10 is back-lighted. It may be discontinuous, vis, fabricated as a plurality of small spacer pads distributed over the structure.

Although it is important to control the various thicknesses in the multilayer device structure according to the invention, this control is not as difficult to achieve as in the fabrication of liquid crystal display devices wherein relatively large rigid plates must be positioned close together. The layer thicknesses in the present device can be achieved by screening or lamination techniques.

Figure 3:
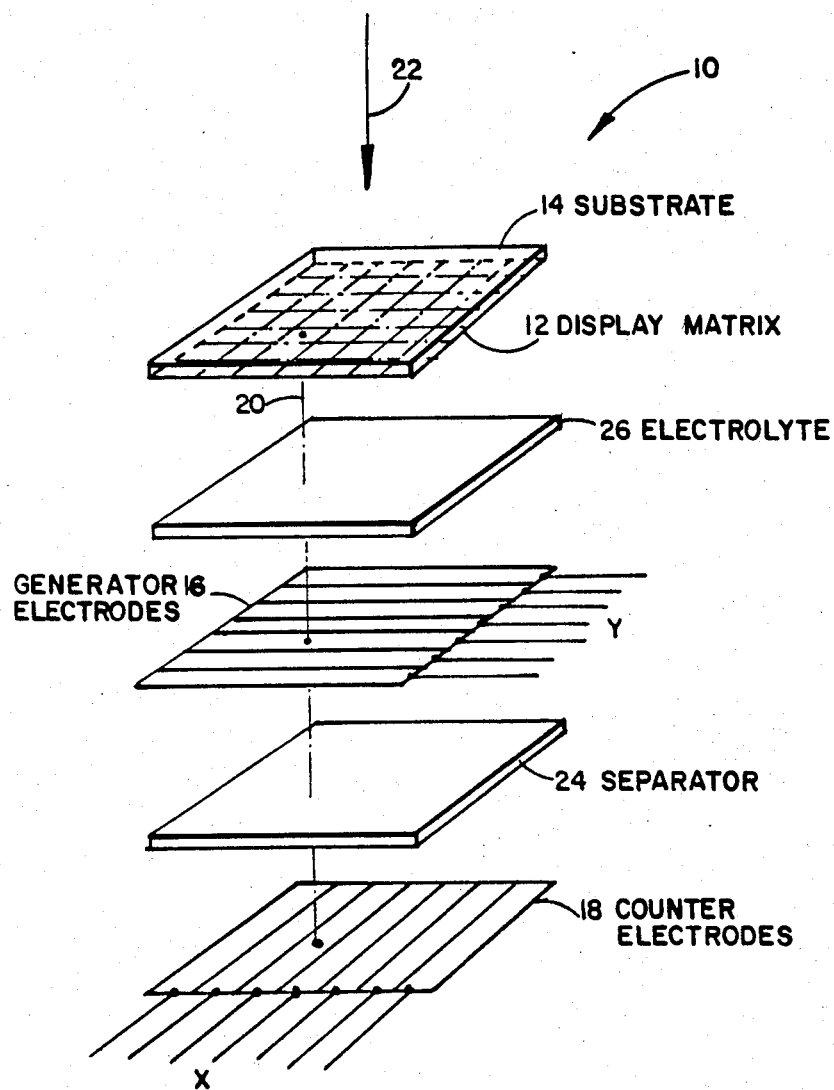
FIG. 3 is an exploded view in perspective of the internal elements of an alternative embodiment of a color-changing display device in accord with the invention.

The alternative embodiment of a chemically coupled color-changing display device shown in FIG. 3 is similar to the embodiment shown in FIGS. 1 and 2. However, in FIG. 3, the insulating substrate 14 on which the display matrix 12 is disposed is on the exterior side of the display elements rather than on the interior side. In this case, the substrate 14 must be transparent while it need not be porous. In fact, the display matrix 12 of FIG. 3 is preferably formed directly on the interior side of a panel which forms part of the wall or envelope for the entire display device 10, thus reducing the number of parts required. In a design for this alternative embodiment, the storage capacity of the electrolyte compartment which includes the display matrix 12 will be limited by needs for rapid switching and adequate resolution. That is to say, the distance between the generator electrodes 16 and the display matrix 12 is limited by these considerations.

While the invention has been described with respect to the preferred embodiments thereof, it will be understood by those skilled in the art that various changes in form and details may be made therein without departing from the spirit and scope of the invention. For example, although the primary use of the chemically coupled drive concept described above is expected to be for matrix displays, the same switching approach can also be applied to alphanumeric and graphic display devices wherein multiplexed addressing is not required.

What is claimed is:

1. A method of producing a color change in a distinct element of solid, insoluble color-changing material wherein said material is capable of reversibly changing color by reaction with soluble reactants, the method comprising the steps of:
   electrochemically generating said reactants at a point spaced apart from said distinct element; and
   disposing said distinct element to receive said reactants from said point by diffusion through an electrolyte.

2. The method of claim 1, wherein said soluble reactants are soluble oxidizing and reducing agents.

3. The method of claim 2, wherein said display material is an electrochromic material.

4. The method of claim 3, wherein said electrochromic material is a rare-earth dipthalocyanine or a dipthalocyanine of yttrium or scandium.

5. The method of claim 4, wherein said electrochromic material is lutetium dipthalocyanine.

6. The method of claim 1, and further comprising:
   providing a generator electrode and a counter electrode; and
   interposing selective separator means between said counter electrode for preventing loss of electrochemically generated soluble reactants from a compartment containing said generator electrode and said element of color-changing material while permitting passage of current-carrying ions between said generator and counter electrodes.

7. The method of claim 6, and further comprising:
   contacting said element of color-changing material, said generator electrode and said counter electrode with a body of electrolyte, wherein said electrolyte initially includes, confined away from said counter electrode, a component of each of two redox couples having one of the two initial components in the reduced form and the other in oxidized form, and wherein the components of said redox couples can be electrochemically converted to produce soluble reactants for reversibly changing the color of said element of color-changing material.

* * * * *